No. 680,187. Patented Aug. 6, 1901.
O. C. ZIMMERMAN.
GRAIN THRESHER AND SEPARATOR.
(Application filed Apr. 21, 1899.)
(No Model.)
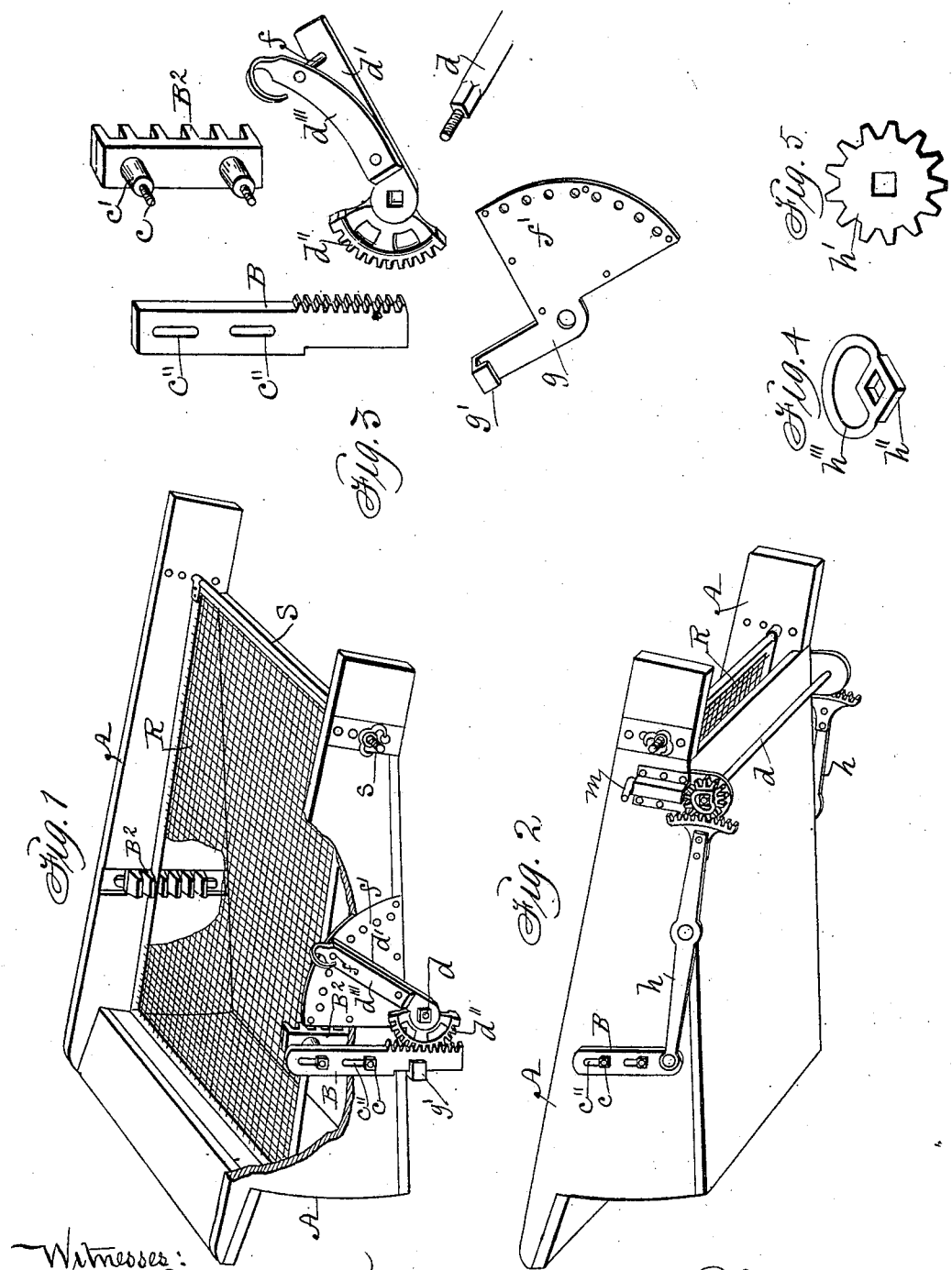

UNITED STATES PATENT OFFICE.

ORRIN C. ZIMMERMAN, OF HAMPTON, IOWA.

GRAIN THRESHER AND SEPARATOR.

SPECIFICATION forming part of Letters Patent No. 680,187, dated August 6, 1901.

Application filed April 21, 1899. Serial No. 713,904. (No model.)

*To all whom it may concern:*

Be it known that I, ORRIN C. ZIMMERMAN, a citizen of the United States, residing at Hampton, in the county of Franklin and State of Iowa, have invented a new and useful Improvement in Grain-Separators, of which the following is a specification.

My object is to provide simple, durable, and efficient means adapted to be applied to threshers and separators of different construction and form for the purpose of adjusting a frame carrying removable and interchangeable sieves.

Heretofore frames for carrying sieves have been supported by a rod extended through from one side of the main frame to the other and raised and lowered with the rod by means of racks fixed to the main frame and pinions fixed to the rod. A vertically-adjustable rod for supporting sieves is objectionable because it is an obstruction to the free passage of matter that is forced outward over the sieves by means of a fan.

My invention consists in the arrangement and combination of a rotatable shaft in bearings fixed to the under side of the bottom of the stationary frame and adjustable frames carrying sieves and means for raising and lowering said frames, as hereinafter set forth, pointed out in my claims, and illustrated in the accompanying drawings, in which—

Figure 1 is a perspective view of the frame adapted to be detachably placed in a thresher and separator to be vibrated therein, a part being broken away to show the adjustable frames adapted for carrying interchangeable and adjustable sieves. Fig. 2 is a perspective view showing the side and bottom of the frame that is to be vibrated in a thresher and separator, and also showing a modified construction of mechanism for raising and lowering the sieve-carrying frames. Fig. 3 shows a group of devices of peculiar form adapted to be combined with the frames, as shown in Fig. 1. Fig. 4 shows a nut provided with an integral handle, and Fig. 5 a pinion adapted to be combined with a shaft and rack, as shown in Fig. 2.

The letter A designates a frame adapted in form and size to be adjustably connected with the operative mechanism of a thresher and separator to be vibrated in rear of the fan and beneath a rack and straw-carrier. Adjustable frames composed of straight bars B, having gear-teeth at the edges of their lower portions, and straight bars $B^2$, having a plurality of lateral projections adapted to support sieves, are united and connected with the parallel sides of the frame A by means of bolts $c$ and collars $c'$, placed on the bolts and the bolts extended through said parallel sides and also through vertical slots $c''$ in the outside bars B in such a manner that said frames can be raised and lowered relative to the parallel sides as required to adjust the rear end of one or more sieves carried by the adjustable frames.

$d$ is a shaft supported in bearings fixed to the under side of the bottom of the main frame, but not shown.

$d'$ is a lever that has an integral toothed segment $d''$ at one end adapted to engage the teeth on the bar B in such a manner that the adjustable frames can be raised and lowered by means of the lever $d'$.

$d'''$ is a spring fixed to the lever $d'$ and carries a pin $f$ for retaining the lever stationary at any point desired.

$f'$ is a triangular-shaped plate adapted to be fixed against the outside of the frame A to serve as a bearing for the shaft $d$. It is provided with a plurality of perforations that adapt it to serve as a rack to admit the spring-actuated pin $f$ as required to retain the lever $d'$ stationary at different angles relative to the shaft $d$.

The shaft $d$ has a toothed segment $d''$ at each end in engagement with the teeth at the lower end portions of the bars B, so that when the lever $d'$ is operated the bars B will be simultaneously adjusted thereby as required to raise or lower the adjustable frames relative to the main frame. It is obvious that a pinion or toothed sector on each end of the shaft $d$, as shown in Fig. 2, is essential for simultaneously adjusting the two adjustable frames that are connected with the parallel sides of the main frame.

$g$ is an extension at the lower corner of the plate $f'$ and terminates in an angular hook $g'$, adapted to serve as a bearing, as shown in Fig. 1, for the bar B, as that bar is moved up and down by means of the lever $d'$ and toothed segment $d''$, fixed on the angular end of the shaft $d$.

In Fig. 2 levers $h$ are fulcrumed to the frame A and one end of each lever pivotally connected with the outside bar of one of the adjustable screen-carrying frames and the other end connected with the shaft $d$ by means of a toothed sector fixed to the lever and a pinion $h'$ fixed to the end of the shaft $d$ by means of a nut $h''$, that has an integral handle $h'''$, adapted to serve as a means for rotating the pinion and shaft to operate the lever as required to thereby raise and lower the sieve-carrying frames.

$m$ is a spring-actuated bolt adapted to engage the pinion as required to retain the sieve-carrying frames stationary at different points of elevation at different times.

Sieves R can be readily and adjustably connected at one end with the parallel sides of the frame A by means of rods S and with the adjustable frames at their other ends, as shown in Figs. 1 and 2.

From the foregoing description of the construction and function of each element the application, operation, and utility of my invention will be readily understood by persons familiar with the art to which it pertains.

I claim as my invention—

1. In a grain-separator, a main frame adapted to be connected with the operative mechanism of a separator, bars adapted for carrying sieves inside of said main frame, adjustable bars on the outer sides of the parallel side walls of the main frame, slots in the said parallel side walls, bolts extended through said slots for connecting the adjustable bars on the outer sides of the main frame with the bars inside for carrying sieves, and means for raising and lowering the bars on the outside and the bars on the inside of the main frame simultaneously, arranged and combined to operate in the manner set forth for the purposes stated.

2. In a grain-separator, a main frame adapted to be connected with the operative mechanism of a separator and provided with openings in its parallel sides, bars having racks on their lower end portions fitted to the parallel sides of the main frame on their outer sides and adapted for vertical adjustment, bars provided with lateral projections on their inside faces to support sieves on the inner sides of the parallel sides of the frame, means for connecting the bars on the inside of the main frame with the bars on the outside of the same frame, a rotatable shaft in bearings on the under side of the bottom of the main frame and toothed sectors on each end of the shaft to engage said racks on the adjustable bars, a lever for operating the rotatable shaft and means for locking the shaft, arranged and combined to operate in the manner set forth for the purposes stated.

ORRIN C. ZIMMERMAN.

Witnesses:
F. B. MARBLE,
J. Y. LUKE.